June 8, 1926.
O. W. HOWARD ET AL
POWER LIFT MECHANISM
Filed June 11, 1923
1,587,648
5 Sheets-Sheet 1
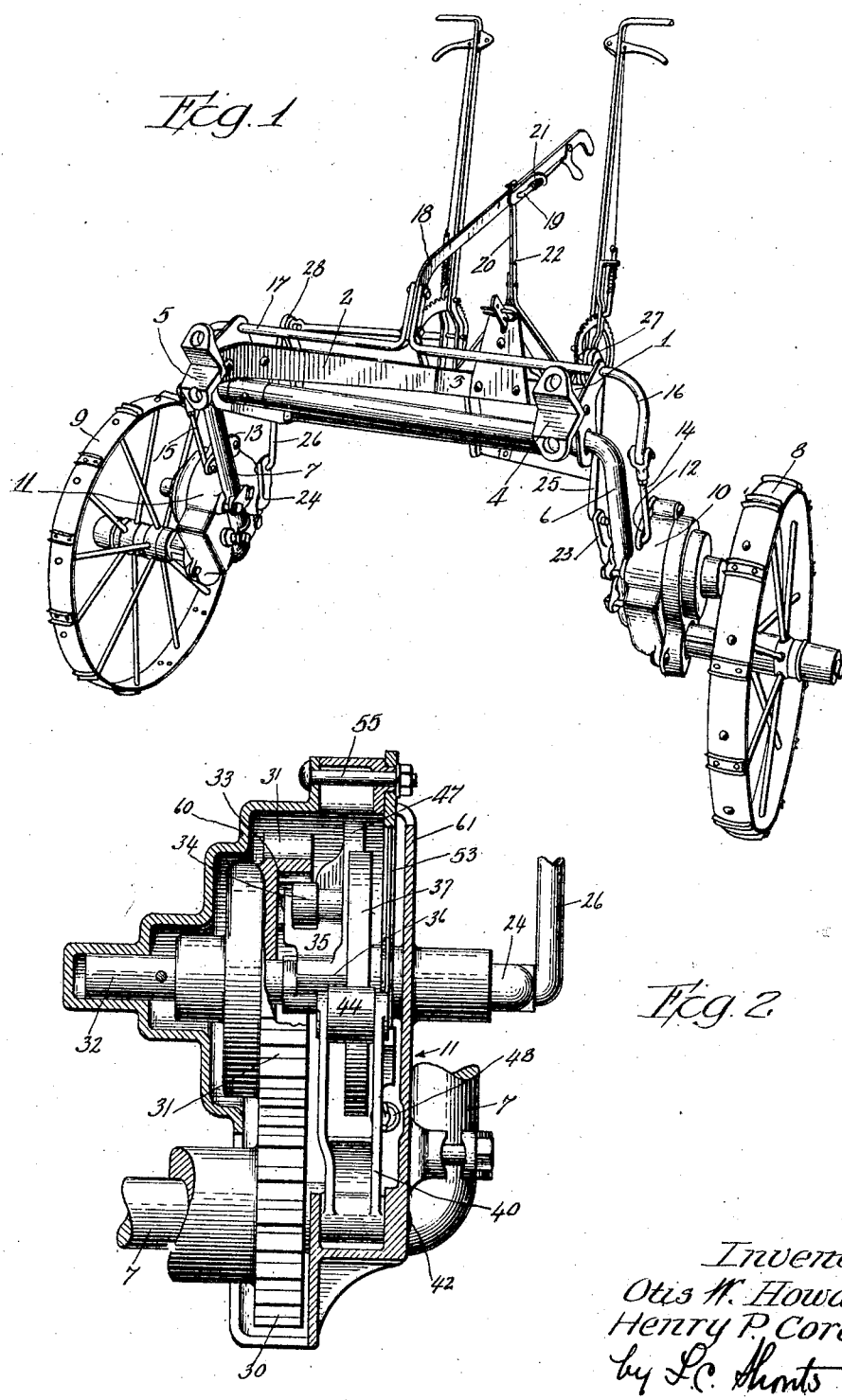
Inventors:
Otis W. Howard
Henry P. Corbin
by L.C. Shunts Atty

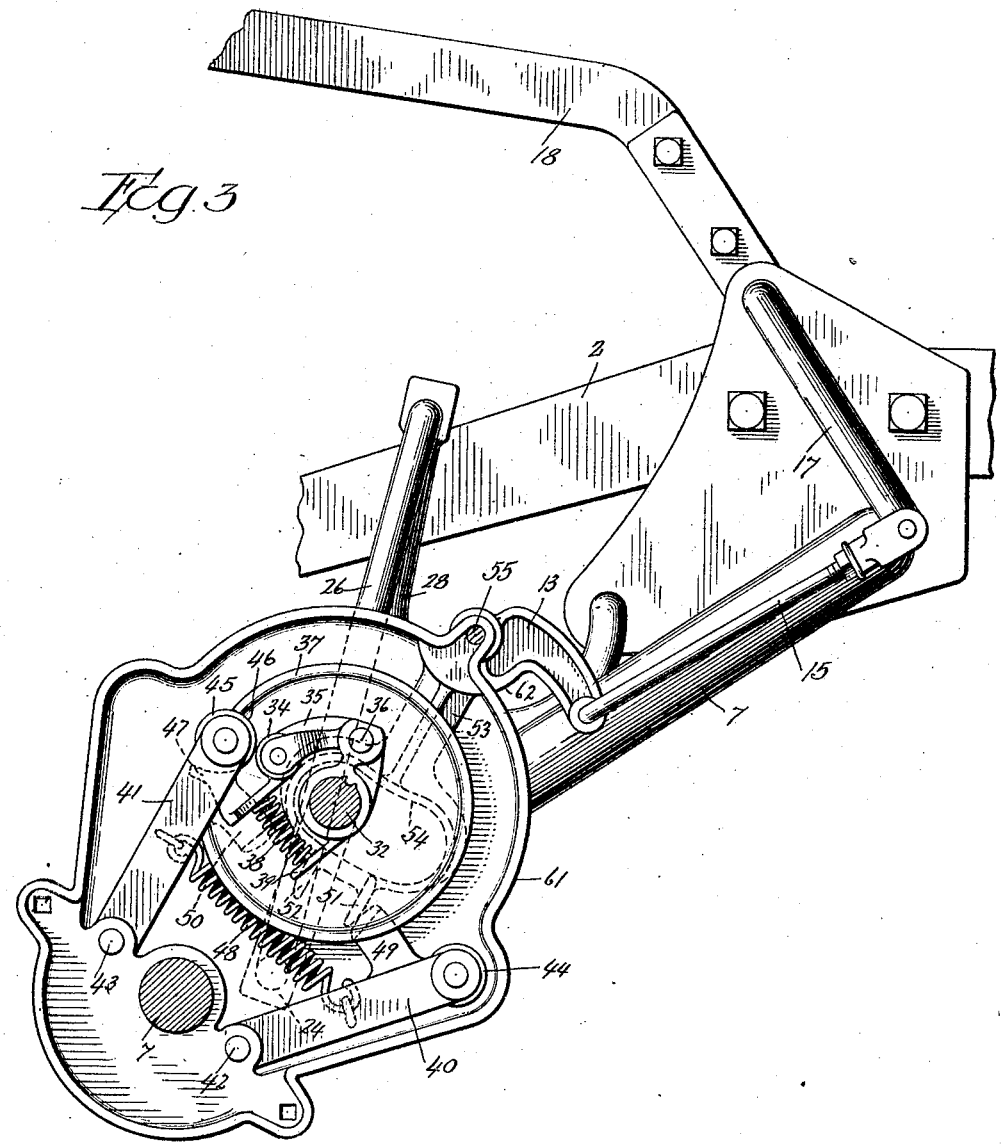

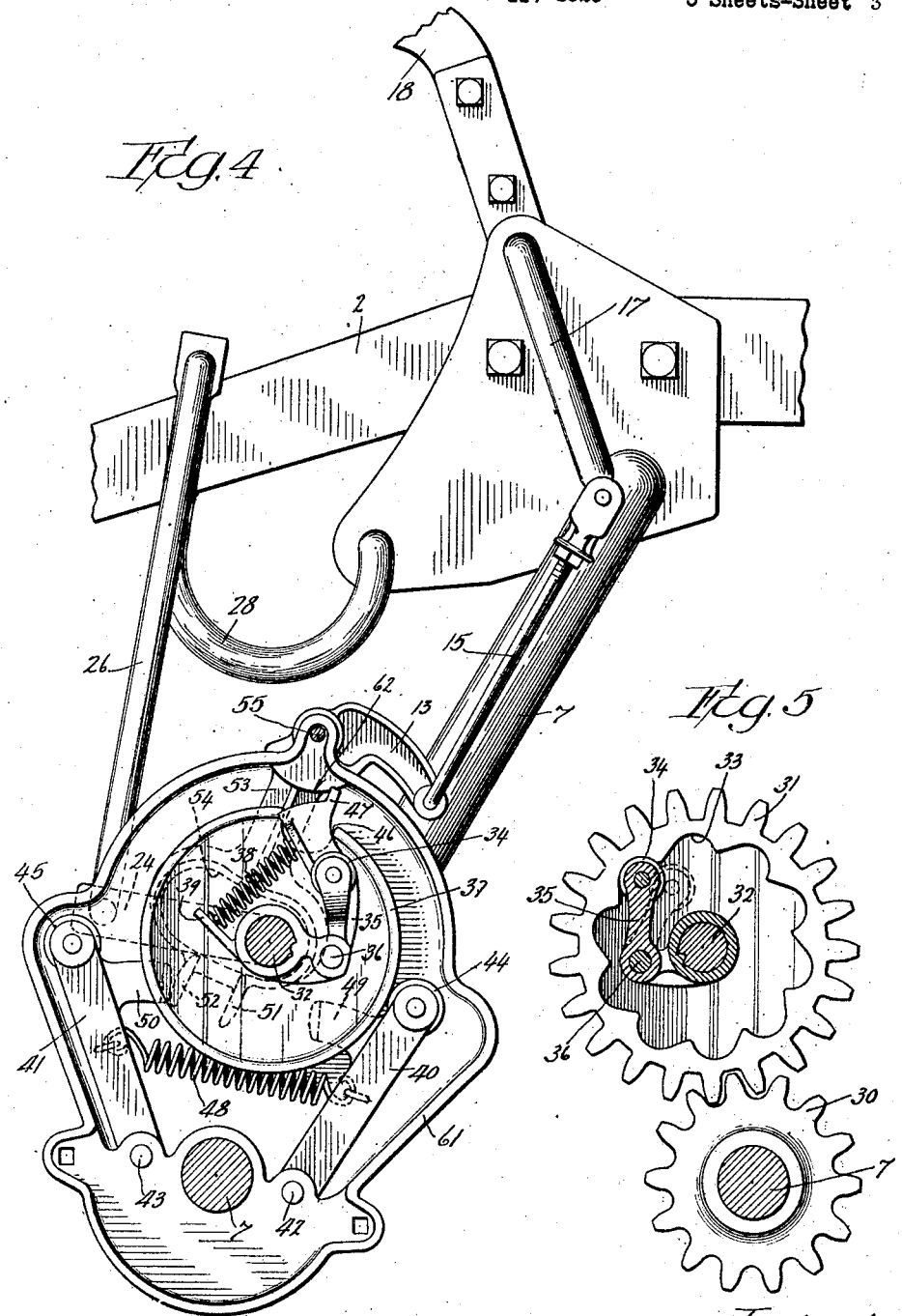

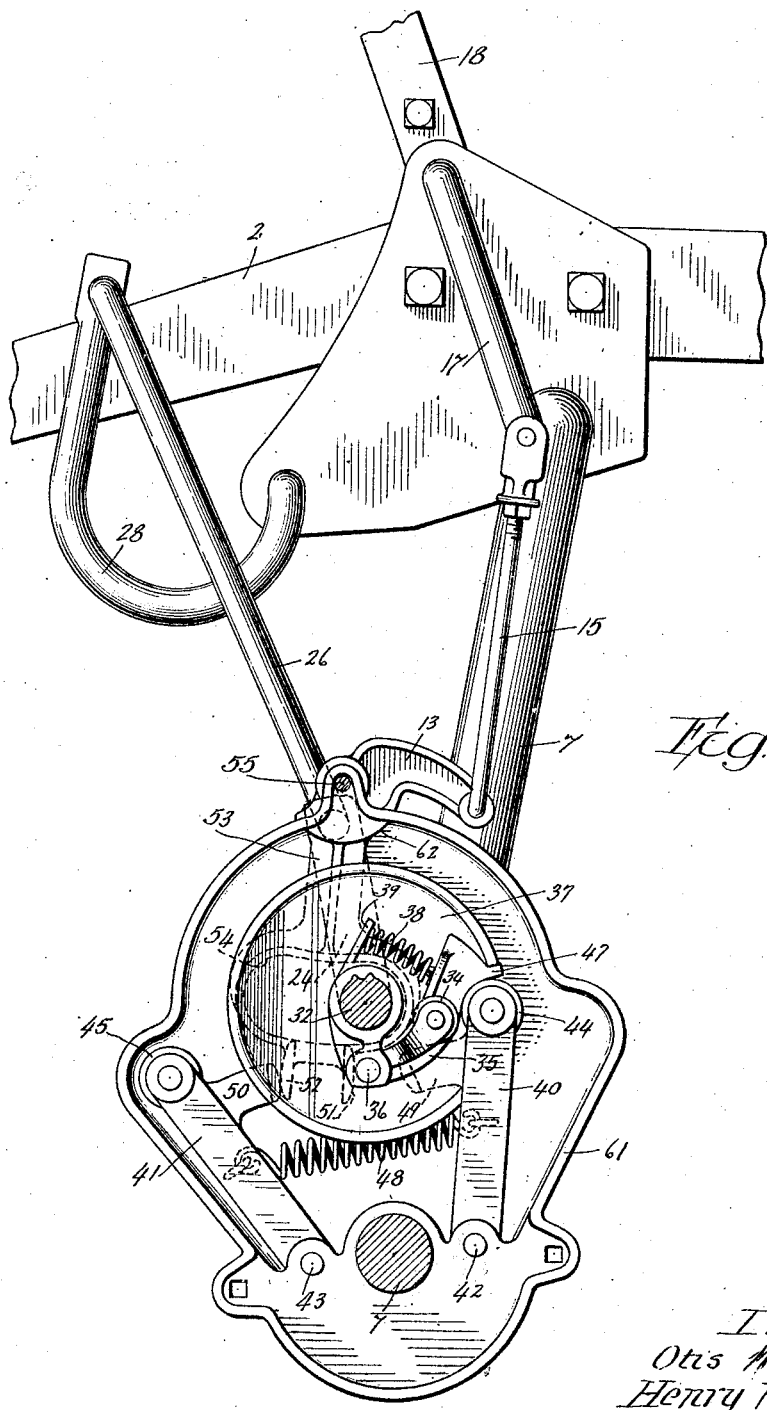

June 8, 1926.

O. W. HOWARD ET AL 1,587,648

POWER LIFT MECHANISM

Filed June 11, 1923

Inventors
Otis W. Howard
Henry P. Corbin
by L.C. Shunts Atty.

Patented June 8, 1926.

1,587,648

UNITED STATES PATENT OFFICE.

OTIS W. HOWARD AND HENRY P. CORBIN, OF MOLINE, ILLINOIS, ASSIGNORS, BY MESNE ASSIGNMENTS, TO MOLINE IMPLEMENT COMPANY, A CORPORATION OF ILLINOIS.

POWER LIFT MECHANISM.

Application filed June 11, 1923. Serial No. 644,795.

The invention relates to a powerlift mechanism.

It relates particularly to powerlift mechanisms of the type used with agricultural implements for swinging the crank axles of such implements to raise and lower the implements. It is shown and described in connection with a universal agricultural tool carriage of the type set forth in the copending application of Joseph E. Boda, Serial No. 644,581, filed June 11, 1823.

Implement powerlift mechanisms of this general type are constructed so that, when set into operation, they will move through a cycle of movement and then automatically stop. It is possible, however, due to the weight of the implement, for a mechanism of this character to move so quickly, when the implement is being lowered, that it will reach the end of its cycle before the operator will have released the controlling lever, in which event, with the controlling lever in tripped position, the powerlift will move through another cycle of movement, which is not desired.

It may also happen that one of the ground wheels of the implement will not be rotating when the control lever is operated for tripping a powerlift mechanism of this general type. For example, if the implement is being turned, one of the ground wheels may remain substantially stationary.

The powerlift associated with the wheel that is moving will be tripped into operation, but if the tripping means for the other powerlift is released before the ground wheel moves to actuate the powerlift, the tripping means may return to its initial position and the powerlift will not be actuated. This leaves one side of the machine lowered while the other is raised. The present invention has been directed to the solution of these problems.

The general object of the invention is to provide an improved powerlift mechanism for agricultural implements.

A further object is to provide a powerlift mechanism and a controlling means which, when set for a given position, will insure that the powerlift will move to that position regardless of whether or not the movement starts immediately.

A further object is to provide a powerlift mechanism having control means which, when set for a given position for the powerlift, will make it impossible for the powerlift to stop in any other than the intended position.

Other objects and advantages of the invention will hereinafter appear.

An embodiment of the invention is shown in the drawings in which,

Figure 1 is a perspective of a universal implement with the powerlift mechanism applied thereto.

Figure 2 is a section of one of the powerlift mechanisms.

Figure 3 is a section and partial side elevation of the powerlift mechanism showing it in the position it occupies when the machine is lowered.

Figure 4 is a view similar to Figure 3, illustrating the position of the parts after the powerlift has been tripped into operation and movement started.

Figure 5 is a side elevation and partial section of the driving gears of the powerlift viewed from the opposite side to that of Figure 4.

Figure 6 is a view similar to Figure 3 with the parts in the position they occupy when the machine is raised and when the powerlift mechanism has automatically stopped.

Figure 7:
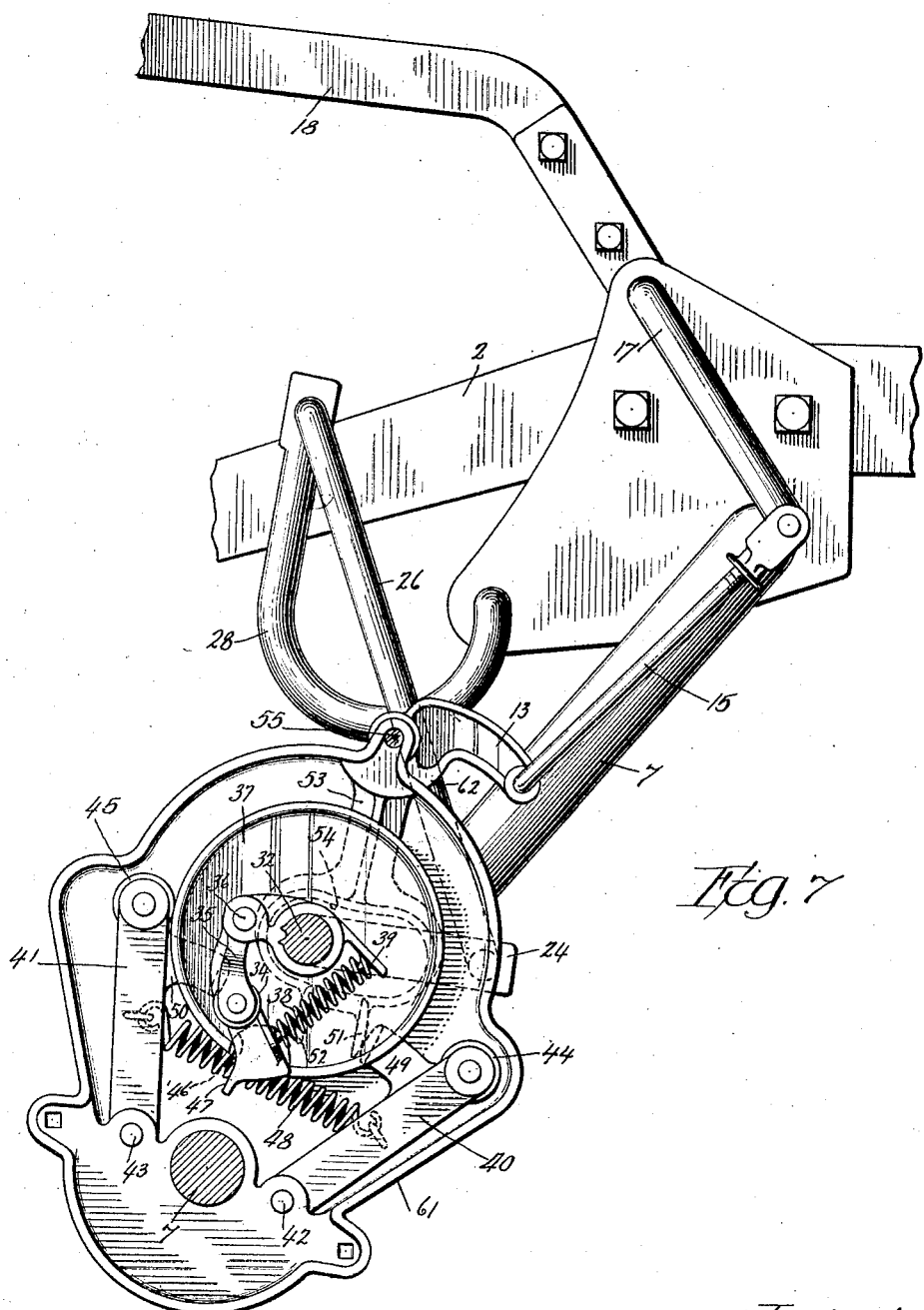
Figure 7 is a view similar to Figure 6 with the parts in the position they occupy when the powerlift mechanism has been tripped to lower the machine and after movement thereof has been started.

The powerlift mechanism is illustrated in connection with a universal agricultural tool carriage, but it will be understood that it can be used with any other suitable agricultural implement.

The universal tool carriage includes draft bars 1 and 2 connected together by a cross brace 3. The bars have their rear ends shaped at 4 and 5 for the reception of a supporting bar or other connecting device forming a part of a tool unit. Pivoted in bearings on the draft bars are crank axles 6 and 7 carrying ground wheels 8 and 9. Supported on the crank axles are powerlift mechanisms 10 and 11 respectively. Housings enclose the powerlift mechanisms to exclude dust and dirt and to permit lubricant to be retained for oiling the parts. The powerlift mechanisms have tripping levers 12 and 13 respectively connected by links 14 and 15 to the cranked ends of shafts 16 and 17 which are attached to a control lever 18. The control lever has a latch 19 cooperating with notches in a locking bar 20 pivoted to the frame to give it a limited movement to accommodate the movement of the lever 18 with its latch, both of which move through an arc. The latch 19 is biased by a spring 21 into engagement with the bar 20 so that the latch snaps into the notches in the bar when moved to the proper position. For example, if the latch is operated to release the lever in the position shown in Figure 1, and, if the lever is then moved downwardly and stopped before it reaches the notch 22, the lever will stay in the position to which it has been moved because the latch contacts the edge of the bar with sufficient firmness to hold the lever in position. When the lever is moved down still farther, the latch will snap into the notch 22 and hold the lever in position.

This rigid connection between the control lever and the powerlifts insures that both powerlifts will be set into operation simultaneously.

The powerlift mechanisms intermittently rotate cranks 23 and 24 which are connected by links 25 and 26 respectively, to links 27 and 28, which, in turn, are pivoted to bearings on the draft bars 1 and 2. The cranks 23 and 24 are shown in Figure 1 in the position they occupy when the carriage is raised. When the powerlift mechanisms are moved through the next cycle of movement, the cranks move to a position approximately 180 degrees from that illustrated. If it be assumed that the draft bars 1 and 2 remain stationary, it will be understood that this movement will swing the crank axles 6 and 7 upward closer to the draft bars. The effect is to lower the machine because the ground wheels on the crank axles always remain in contact with the ground and the carriage itself moves downwardly as the crank axles swing relative to the draft bars.

Both of the powerlift mechanisms are similar except one is right and the other left-handed so that a description of one will be sufficient for an understanding of both.

The powerlift includes a gear 30 illustrated in Figure 2, which is journalled on the crank axle 7 and which is connected to the hub of the land wheel 9. This gear is in mesh with an annular gear 31 journalled loosely on the stub shaft 32 having the crank 24 integral with it. The interior of the gear 31 is provided with a plurality of notches 33, illustrated more clearly in Figure 5. Cooperating with these notches is a roller 34 carried by a dog 35 pivoted at 36 on a disc 37 keyed to the stub shaft 32. The dog 35 is normally biased by a spring 38 resting at one end on the lug 39 and having its other end engaging the dog to cause the roller 34 to engage in one of the notches 33 in the rotating gear 31. The gear 31 rotates continuously with the land wheel, and if the roller 34 is in engagement with one of the notches 33, the disc 37 is locked to gear 31 and the stub shaft 32 will be rotated with the gear, thereby rotating crank 24.

The dog 35 is held so that the roller 34 is disengaged from the notches 33 by latches 40 and 41 pivoted to the housing at 42 and 43 respectively. These latches carry rollers 44 and 45 respectively which engage in a notch 46 in the periphery of the disc 37 and which also engage the projecting end 47 of the dog 35. The two latches 40 and 41 are connected by a spring 48 for a purpose which will be hereinafter described. The latches are provided with projections 49 and 50 respectively, which are engaged by corresponding projections 51 and 52 carried by a tripping arm 53 having an oblong opening 54 to accommodate the stub shaft and associated parts. The tripping arm 53 is pivoted to 55 and it has integral with it what has heretofore been called the tripping lever 13. It should be noted that the contact between the projections 51—49 and 52—50 is a rolling contact which develops little friction and has long life.

When the machine is in lowered position, the parts occupy the position illustrated in Figure 3. The projection 51 of the tripping lever 53 is in engagement with the projection 49 to positively hold the latch 40 out of contact with the plate 37. This puts the spring 48 under tension and resiliently holds the latch 41 in the notch 46 and in engagement with the projecting end 47 of the dog 35, thereby holding the roller 34 out of engagement with the notches 33 and the rotating gear 31. The clutch is accordingly disengaged and the disc 37 is locked in position by the latch 41.

When it is desired to raise the machine, the lever 18 is pulled upwardly which swings the lever 17 in a clockwise direction pushing down on the link 15. This swings the tripping lever 13 clockwise and moves the arm 53 to the position illustrated in Figure 4. This moves the projection 51 out of contact with the projection 49, permitting the latch 40 to move so that the roller 44 engages the periphery of the disc 37. The same movement of the arm 53 causes the projection 52 to engage the projection 50 on the latch 41 to positively move the latch out of engagement with the notch 46. At the same time, the spring 48 is put under tension to resiliently pull the latch 40 to the position illustrated in Figure 4. When the latch 41, with its roller 45 has been moved out of notch 46 and out of engagement with the projection 47, the spring 38 biases the dog 35 to cause the roller 34 to engage in one of the notches 33 in the rotating gear 31. This locks the disc 37 to the rotating gear 31 so that the disc is rotated with the gear and, in turn, the stub shaft with the crank 24 is rotated with the disc. The clutch is thus set into operation and the position of the parts after movement has been started, is illustrated in Figure 4 where the notch 46 has moved about half way around toward its next position. It will be observed that the movement of the tripping lever has positively moved the latch 41 out of engagement with the disc 37 and has held it out of engagement and, at the same time, the other latch 40 has been moved into engagement with the disc 37 so that the roller 44 is riding on the periphery of the disc, ready to snap into notch 46 when the notch reaches a position opposite the roller.

When the notch 46 reaches a position opposite the roller 44, the roller snaps into the notch under the tension of the spring 48 whose tension is greater than the resistive action of the spring 38, which action forces the projecting end 47 of the dog 35 backwardly against the tension of spring 38, thereby disengaging the roller 34 from the notch 33 with which it has been in engagement. This automatically stops the clutch and locks it in position. The position that the parts occupy is illustrated in Figure 6. It will be observed that the crank axle 7 has reached an almost vertical position and that the crank 24 is pointing upwardly instead of downwardly as in Figure 3. The crank 24 has not moved through an entire half revolution or 180 degrees. Instead, it has moved through less than 180 degrees and it is locked in position by the latch 40. During the next movement it moves through more than 180 degrees to arrive in its original position, whereupon it is locked into position by the latch 41.

When it is desired to lower the machine, the lever 18 is pushed downwardly from the position of Figure 6, which moves the crank 17 in a counterclockwise direction and pulls up on the link 15. This moves the tripping lever 13 and the arm 53 counterclockwise. The position of the parts is illustrated in Figure 7. The projection 52 has been moved out of engagement with projection 50 and projection 51 has been moved into engagement with projection 49. In other words, the latch 40 has been positively moved out of engagement with the notch 46 and has been lifted clear of the disc 37, while the latch 41 has been resiliently pulled by the spring 48 into engagement with the disc 37 so that the roller 45 rides on the periphery of the disc and is in position to engage the notch 46 when that notch reaches a position opposite the roller 45. The disc 37 is shown in Figure 7 with the notch 46 moved about half way toward the position opposite the roller 45. When the notch gets opposite roller 45, the roller is snapped into the notch by the tension of spring 48 against the projecting end 47 of the dog 35 and the roller 34 is disengaged from the notch 33 with which it may have been in engagement.

An important advantage of this powerlift is that it is positive and that, when once the control lever 18 is moved, the clutch can stop in only one position. For example, when the lever 18 is raised upward from the position of Figure 3 to that of Figure 4, the latch 41 is positively moved out of engagement and held out of engagement so that it is inoperative to stop the clutch. Also, it cannot return to its original position to prevent the clutch from moving should the land wheel not start immediately. At the same time, the opposite latch 40 is moved into engagement with the disc 37 so that it immediately becomes active and is in a position to stop the clutch when the disc 37 reaches the next position. The only position in which the clutch can stop after the control lever has thus been moved is the position that was intended, that is, the position in which the notch 46 is opposite the roller 44. The same holds true when the control lever 18 is moved downwardly from the position of Figure 6 to that of Figure 7. The latch 40 is positively moved out of engagement and held out of engagement while the latch 41 is moved into engagement and held in a position to stop the clutch as soon as it is moved to the desired extent.

With this construction the operator, by a simple movement of the control lever 18, trips both clutches simultaneously and when he moves the control lever to operate the clutches through a cycle of movement, the clutches must move through that cycle because the lift mechanism is set so that, no matter whether it operates immediately or a fraction of a second later, the only position in which it can stop is the position corresponding to the movement of the control lever. This insures that both sides of the carriage will be raised and it prevents any possibility of one side being raised while the other is lowered.

By referring to Figure 2, it will be observed that there are several advantageous features of construction which add to the simplicity and strength of the powerlift mechanism. The clutch housing is made in two parts 60 and 61. The stub shaft 32 is journalled in the housing so that no extra bearings are required. The housing is clamped to the crank axle 7. It completely surrounds the rotating parts to exclude dust and dirt and to permit lubricant to be retained within the housing. The only projecting parts are the rotating crank 24 which is snugly fitted in the bearing in the housing and the tripping lever 13, which is pivoted to the housing and which has a curved portion 62 that completely fills the notch in the housing at all times to prevent the entrance of dirt and the exit of lubricant. The tripping levers 40 and 41 are pivoted opposite the disc 37 so that no overhanging bearings are required and the housing is constructed so as to form a support for the bearings of the pivots on each side of the arm. This makes a simple and very rigid construction.

It will be understood that the construction shown is for purposes of illustration and that variations may be made in it without departing from the spirit and scope of the invention as defined by the claims.

We claim:

1. In a powerlift mechanism for implements, a continuously rotatable member, an intermittently rotatable member, connecting means for connecting and disconnecting said members, said connecting means being normally biased to connecting position, and controlling mechanism engaging said connecting means to move it to and hold it in disconnected position, said controlling mechanism including devices which, when the controlling mechanism is operated, act positively and independently of the rotation of the rotatable members to release the connecting means to permit it to connect the rotatable members together and which are set and held in position to cause the connecting means to disconnect the rotatable members only at a predetermined position of said rotatable members.

2. In a powerlift mechanism for implements having ground wheels, a rotatable member rotated by an implement ground wheel, an intermittently rotatable member, connecting means normally biased to connect said members together, and controlling mechanism for engaging said connecting means to move it to and hold it in disconnected position, said controlling mechanism including members which, when the controlling mechanism is operated, are moved by it to and held in definite positions, one of said members being held out of engagement with the connecting means so that said means is free to connect the rotatable members together and the other member being moved to and held in position where it will engage the connecting means to cause it to disconnect the rotatable members after they have moved through a predetermined cycle.

3. In an implement powerlift mechanism, a continuously rotatable member, an intermittently rotatable member, connecting means normally biased to connect said members together, and a controlling mechanism for the connecting means including two latches for alternately engaging the connecting means to move it to and hold it in disconnected position, said controlling mechanism also including a controlling device for the latches which serves, when operated, to positively move and hold one of the latches out of engagement with the connecting means to permit the latter to connect the rotatable members together and which moves the other latch to a position where it will engage the connecting means to cause the latter to automatically disconnect the rotatable members after they have moved through a definite cycle.

4. In an implement powerlift mechanism, a continuously rotatable member, an intermittently rotatable member, connecting means normally biased to connect said members together, and a controlling mechanism for the connecting means including two latches for alternately engaging the connecting means to move it to and hold it in disconnected position, said controlling mechanism also including a controlling device for moving the latches which serves, when operated, to positively move and hold one of the latches out of engagement with the connecting means to permit the latter to move to connect the rotatable members together, and to simultaneously move the other latch and place it under tension in a position where it will engage the connecting means and move it to disconnected position after the rotatable members have moved through a definite cycle.

5. In an implement powerlift mechanism, a continuously rotatable member, an intermittently rotatable member, connecting means normally biased to connect said members together, and a controlling mechanism for the connecting means including two latches for alternately engaging the connecting means to move it to and hold it in disconnected position, said controlling mechanism also including an operating device for the latches, said operating device serving, when moved in one direction, to move the latch that is in engagement with the connecting means out of engagement with the connecting means and the second latch to a position to engage the connecting means to cause it to disconnect the rotatable members, and, when moved in the other direction, to move the second latch out of engagement with the connecting means and the first latch into position to engage the connecting means to cause it to disconnect the rotatable members.

6. In an implement powerlift mechanism, a continuously rotatable member, an intermittently rotatable member, means for connecting the members together, and mechanism for controlling the connecting means including two latches and a controlling device for the latches serving to positively move one latch out of engagement with the connecting means to permit the latter to connect the members together and to resiliently move the other latch in position to automatically disengage the connecting means after the rotatable members have moved through a predetermined cycle of movement.

7. In an implement powerlift mechanism, a continuously rotatable member, an intermittently rotatable disc having a notch in its periphery, a dog mechanism carried by the disc normally biased to engage the continuously rotatable member to connect the disc to said member, a pair of latches for engaging the notch in the disc and for engaging the dog mechanism to disengage the latter from the continuously rotatable member, an operating means for the latches serving to positively move one latch out of the notch in the disc to thereby permit the dog mechanism to connect the disc to the continuously rotatable member and serving to simultaneously move the second latch into engagement with the periphery of the disc so that it will be in position to automatically enter the notch to disengage the dog mechanism after the disc has moved through a predetermined cycle of movement.

8. In an implement powerlift mechanism, a continuously rotatable member, an intermittently rotatable disc having a notch in its periphery, a dog mechanism carried by the disc and normally biased to engage the continuously rotating member to lock the disc to said member, a pair of latches adapted to bear against the periphery of the disc and to enter the notch therein and to engage the dog mechanism to disconnect it from the rotating member, a resilient connection between the latches, a controlling member adapted to engage said latches alternately with a rolling contact to positively move one latch out of engagement with the notch and simultaneously cause the other to engage the periphery of the disc through the medium of the resilient connection between the latches and, in the next movement, to move the other latch out of engagement with the disc and simultaneously move the first latch into engagement with the disc.

In testimony whereof, we affix our signatures.

OTIS W. HOWARD.
HENRY P. CORBIN.